US007966248B2

(12) United States Patent
O'Connor et al.

(10) Patent No.: US 7,966,248 B2
(45) Date of Patent: Jun. 21, 2011

(54) METHODS AND SYSTEMS FOR PROVIDING TAX EFFICIENT HEDGE FUND RETURNS

(75) Inventors: Matthew S. O'Connor, Summit, NJ (US); Laura A. Burns, New York, NY (US); Ping Feng, Gillette, NJ (US); Aditya V. Bagree, Jersey City, NJ (US); Suk Michael Whang, Brooklyn, NY (US)

(73) Assignee: Barclays Capital Inc., New York, NY (US)

( * ) Notice: Subject to any disclaimer, the term of this patent is extended or adjusted under 35 U.S.C. 154(b) by 197 days.

(21) Appl. No.: 11/344,831

(22) Filed: Jan. 31, 2006

(65) Prior Publication Data
US 2006/0173763 A1      Aug. 3, 2006

Related U.S. Application Data

(60) Provisional application No. 60/648,965, filed on Feb. 1, 2005.

(51) Int. Cl.
*G06Q 40/00*        (2006.01)
(52) U.S. Cl. ............................................ 705/37; 705/35
(58) Field of Classification Search ...................... 705/35
See application file for complete search history.

(56) References Cited

U.S. PATENT DOCUMENTS

| 5,799,287 | A  | * | 8/1998 | Dembo | 705/36 R |
| 7,457,774 | B1 | * | 11/2008 | Bridges et al. | 705/36 R |
| 2001/0056392 | A1 | * | 12/2001 | Daughtery, III | 705/36 |
| 2004/0103127 | A1 | * | 5/2004 | Bjornson et al. | 708/160 |
| 2004/0153388 | A1 | * | 8/2004 | Fisher et al. | 705/36 |
| 2005/0160034 | A1 | * | 7/2005 | Woodruff et al. | 705/39 |
| 2005/0228731 | A1 | * | 10/2005 | Coates | 705/35 |
| 2005/0234797 | A1 |   | 10/2005 | Schwartz | |
| 2006/0026005 | A1 | * | 2/2006 | Rogov | 705/1 |

OTHER PUBLICATIONS

Thomas Wallace, Journal of Financial Service Professional; Mar. 19, 2004; 20,1; ABI/INFORM Global p. 88.*
Jennifer Muller; Stock Options; Jan./Feb. 2004; 20,1; ABI/INFORM Global p. 38.*
Anonymous; Wall Street Letter; Jan. 11, 1999; 31, 2; ABI/INFORM Global p. 6.*

* cited by examiner

*Primary Examiner* — Hani Kazimi
*Assistant Examiner* — Hatem Ali
(74) *Attorney, Agent, or Firm* — Morgan Lewis & Bockius LLP

(57) ABSTRACT

In one aspect, the invention comprises a method comprising: (1) selling a note to an investor for a specified amount; and (2) using proceeds from selling the note to purchase (a) one or more zero coupon municipal bonds, and (b) an option on at least one of the group comprising: a hedge fund, a fund of funds, and a hedge fund index; wherein the note entitles the investor to substantially all of the returns on the one or more bonds and on the option, wherein the one or more bonds are configured to provide a return substantially equal to the specified amount, and wherein the option is a European option. This option can be a variable option.

10 Claims, 1 Drawing Sheet

METHODS AND SYSTEMS FOR PROVIDING TAX EFFICIENT HEDGE FUND RETURNS

CROSS-REFERENCE TO RELATED APPLICATIONS

This application claims the benefit of U.S. Provisional Application No. 60/648,965, filed Feb. 1, 2005. The entire contents of that provisional application are incorporated herein by reference.

BACKGROUND & SUMMARY

As both the equity and fixed income markets have experienced lackluster returns, growth in alternative investments as an asset class has exploded. With this growth investors are looking for smart ways to invest: principal protection, tax efficiency, reduced income volatility, favorable capital treatment, etc.

The present invention relates to a principally protected hedge fund linked municipal note for clients wanting to avoid phantom income tax and recognize long term capital gains/losses.

In general terms, the invention is directed to providing an investor with a note that has two main components: a municipal (i.e., tax-free) bond and a (preferably European) hedge fund option. As is known in the art, a European option may be exercised only at the expiry date of the option, i.e. at a single pre-defined point in time, as opposed to an American option, which may be exercised at any time before the expiry date.

In one aspect, the invention comprises a method comprising: (1) selling a note to an investor for a specified amount; and (2) using proceeds from selling the note to purchase (a) one or more zero coupon municipal bonds, and (b) an option on at least one of the group comprising: a hedge fund, a fund of funds, and a hedge fund index; wherein the note entitles the investor to substantially all of the returns on the one or more bonds and on the option, wherein the one or more bonds are configured to provide a return substantially equal to the specified amount, and wherein the option is a European option.

In various embodiments: (a) the option is a variable option; (b) the one or more zero coupon municipal bonds mature on a specified maturity date, and the option is exercisable on a date within 12 months of the specified maturity date; (c) the variable option is a periodic reset call option; and (d) a sum of an amount paid to purchase the one or more zero coupon municipal bonds and an amount paid to purchase the option is equal to the specified amount, less commercially reasonable fees.

Some embodiments of the present invention comprise computer components and computer-implemented steps that will be apparent to those skilled in the art. For example, calculations and communications can be performed electronically, and agreements can be composed, transmitted and executed electronically.

For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

DETAILED DESCRIPTION OF PREFERRED EMBODIMENTS

Figure 1:
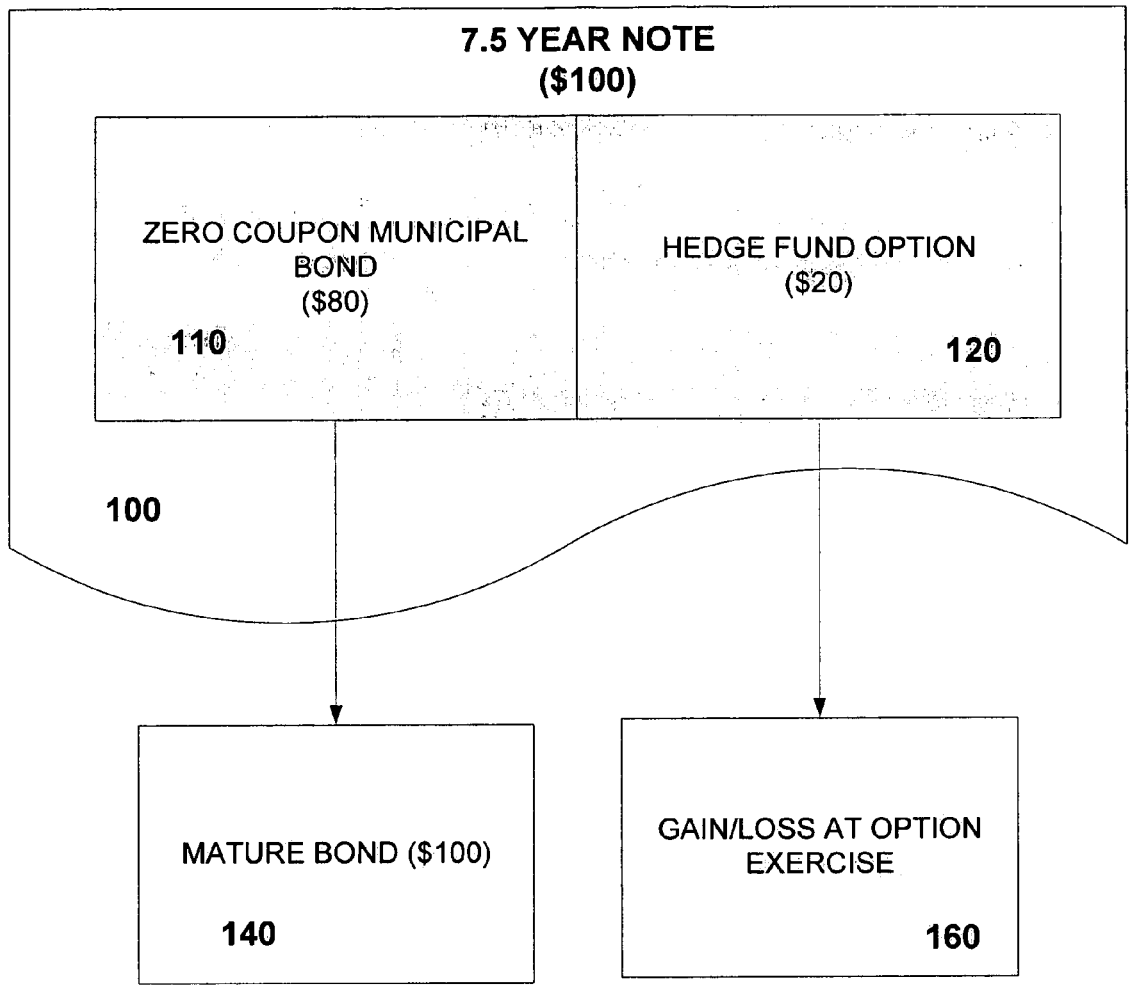
FIG. 1 illustrates a preferred embodiment of the present invention.

In one embodiment, a 7.5 year note, priced at par ($100), can be viewed in two parts: a zero coupon municipal bond and a leveraged hedge fund investment (i.e., an option). The zero coupon bond, worth approximately $80 (in this example), accretes to par ($100), guaranteeing principal.

The invention advantageously uses a hedge fund option instead of a direct hedge fund investment. Direct hedge fund investments subject investors to short term gains/losses due to the trading nature of the fund, yet the investor does not reap actual benefits until her stake in the fund is sold.

In a preferred embodiment, the remaining $20 of the note purchases an option on a fund of funds. Since the $20 purchases an option, the investor is not subject to short term gains/losses (which are taxed at the same rate as ordinary income) but rather long term capital gains/losses (which are taxed at a lower rate than ordinary income) at the expiration of the option.

The option preferably is a variable option—that is, it represents a variable interest in the fund of funds. Initially the note has 100% participation in the performance of the fund of funds (see Notional Amount in Appendix A). On a monthly basis, the participation in the fund of fund return will be adjusted based upon the performance of the fund of funds and the accretion rate charged by a note issuer. Positive performance of the fund of funds may result in an increased participation in the fund of funds (i.e., additional leverage provided by the note issuer). Negative performance of the fund of funds may result in reduced participation in the fund of funds. This feature is often referred to as a Periodic Reset Option (see "Option Adjustment" in Appendix A).

Table A below illustrates the possible outcomes of this note at maturity.

TABLE A

| Return | Tax implication |
|---|---|
| <$100 | N/A* since the zero accretes to $100 |
| $100 to $120 | Tax loss since the purchase price of the option was not recouped |
| >$120 | Long term capital gain |

*N/A assuming that the municipal note does not default.

As depicted in FIG. 1, in a preferred embodiment a 7.5 year note 100 is sold by a note issuer to an investor. The note entitles the investor to receive the proceeds (less a fee charged by the issuer) from two investments: a tax-free municipal bond 110 and a hedge fund option 120. Preferably, approximately 80% of the funds received for the note are invested in one or more (tax-free) zero coupon municipal bonds, and approximately 20% is used to purchase a hedge fund option (preferably an option on a 100% participation—that is, five times the value of the option). At the end of the 7.5 year period, the investor receives the return 140 on the mature bond (approximately 100% of the price of the note) and the option is either exercised or expires, resulting in a gain or loss 160.

An important feature of at least one embodiment is variability of the participation related to the option. As stated above, for each $20 invested in the option, the holder is given an initial participation in a fund of funds of $100. However (see Appendix A), on a monthly or other periodic basis, that participation may be adjusted, based on the performance of the fund of funds. Appendix A provides exemplary adjustment formulas, but these are intended to be only exemplary—those skilled in the art will recognize that various other adjustment formulas could be used without departing from the scope of the present invention.

An exemplary INDEX (see Appendix A) used in an embodiment of the invention is the Dow Jones Hedge Fund Balanced Portfolio Index.

In an alternate embodiment, certificates (due, say, October 2012) are issued by a trust established pursuant to a series Trust Agreement between a Depositor and a Trustee. The Trust Agreement incorporates the standard terms for trust agreements. Each certificate represents a fractional undivided ownership interest in the Trust.

The principal assets of the Trust are (i)(a) a (for example) $2,950,000 principal amount of a Zero Coupon Custodial Receipt (see Appendix B) due Jul. 1, 2012, issued by a Custodial Receipt Agent, and (b) a Final Interest Payment Custodial Receipt (see Appendix B) issued by the Custodial Receipt Agent; and (ii) the rights of the Trust under a 1992 ISDA Master Agreement (Multicurrency—Cross Border) (a Periodic Reset Call Option Agreement—see Appendix C) with a Call Option Seller pursuant to which, in exchange for a Call Option Premium received from the Trust on an Effective Date, the Call Option Seller pays each Call Option Settlement Amount, if any, on any Call Option Settlement Date. The amount of a Call Option Settlement Amount is determined based on performance of an Index (e.g., the Dow Jones Hedge Fund Balanced Portfolio Index). Each certificate entitles the holder to a pro rata share of distributions from the Trust.

While particular elements, embodiments, and applications of the present invention have been shown and described, it should be understood that the invention is not limited thereto, since modifications may be made by those skilled in the art, particularly in light of the foregoing teaching. The appended claims are intended to cover all such modifications that come within the spirit and scope of the invention. This description does not constitute and is not intended to provide tax or accounting advice. Those seeking to implement any aspect of the described invention should seek the advice of their own accounting and legal advisors as to the treatment of proposed implementations in the context of specific circumstances.

APPENDIX A

PRINCIPAL PROTECTED [INDEX] LINKED NOTE
USD DENOMINATED PRINCIPAL PROTECTED NOTE
LINKED TO THE [INDEX]

| | |
|---|---|
| Note Issuer: | Special Purpose Issuer [Delaware business trust] |
| Principal Amount: | USD 100,000,000 |
| Denominations: | USD 1,000 - minimum purchase of USD 100,000 |
| Maturity Date: | Oct. 31, 2012, subject to adjustment in accordance with the Following Business Day Convention, an Early Redemption Event or if the Valuation Date is postponed. |
| Maturity Value: | 100% + Cash Settlement Amount |
| Index: | [INDEX description] |
| Index Level: | INDEX value as of Apr. 27, 2005. |
| Trade Date: | TBD |
| Issue Date: | Apr. 27, 2005 |
| Deposited Assets: | USD 100,000,000 Municipal Certificate maturing Jul. 1, 2012. |
| | USD 100,000,000 Notional amount of the Index Option. |

APPENDIX A-continued

PRINCIPAL PROTECTED [INDEX] LINKED NOTE
USD DENOMINATED PRINCIPAL PROTECTED NOTE
LINKED TO THE [INDEX]

| | |
|---|---|
| Municipal Certificate: | A certificate representing the right to receive the principal paid on AAA/Aaa rated municipal bonds on the Jul. 1, 2012. |
| Index Option: | Cash settled option contract between the Note Issuer and the Option Seller under which the Note Issuer will pay the Premium and the Option Seller will pay the Cash Settlement Amount, as described below. |
| Early Redemption Events: | Upon the occurrence of an Early Redemption Event, the Notes will be redeemed on the Early Redemption Date at a price equal to the Early Redemption Amount. An "Early Redemption Event" means the occurrence of any of the following events, as determined by the Calculation Agent: 1. The occurrence of an Early Termination Event with respect to the Index Option; or 2. The Deposited Bonds default or are deemed taxable. If an Early Redemption Event occurs, the Note Issuer will send notice of early redemption to Note holders, the Notes will be redeemed as of the Early Redemption Date and the Note Issuer will pay to Note holders on the Early Redemption Date the Early Redemption Amount. |
| Early Redemption Amount: | An amount equal to the market value of the Municipal Certificate, as determined by the Calculation Agent, plus the Early Termination Amount. |
| Early Redemption Date: | The date provided in the Note Issuer's notice of early redemption to the Note holders, provided that such date shall be no later than 60 calendar days following the day the Calculation Agent determines that an Early Redemption Event has occurred. |

Municipal Certificate Terms

| | |
|---|---|
| Certificate Payment Amount: | USD 100,000,000 |
| Certificate Payment Date: | Jul. 1, 2012 |
| Municipal Trust: | A trust which holds the Deposited Municipal Bonds and issues the Municipal Certificate to the Note Issuer. The Municipal Certificate represents the right to receive an amount of principal paid on the Deposited Bonds equal to the Certificate Payment Amount. |
| Deposited Bonds: | Municipal bonds in an aggregate principal amount no greater than USD 100,000,000 which mature no later than Certificate Payment Date and are rated AAA/Aaa at the time such bonds are deposited into the municipal trust. |
| Depositor: | [Depositor] |
| Substitution of Deposited Bonds: | The Depositor shall have the right to deposit additional municipal bonds into the Municipal Trust and withdraw a like principal amount so long as the delivered bonds mature no later than Oct. 31, 2012 and are rated at the time of substitution AAA/Aaa. |

Index Option Terms

| | |
|---|---|
| Option Seller: | [ ] |
| Option Style: | European (exercisable only on the Exercise Date) |
| Exercise Date: | [Jan. 1, 2012], subject to adjustment in accordance with the Following Business Day Convention, an Early Termination Event or if the Valuation Date is postponed. |
| Valuation Date: | The Valuation Date for automatic exercise of the Index Option on the Exercise Date shall be the last Calendar day of the month prior to the Exercise Date, provided that if such date is not an Index Business Day, the Calculation Agent shall refer to the Index Level for the immediately preceding Index Business Day. in determining the Index Level for such Valuation Date; provided further that if the Calculation Agent determines that a Market Disruption Event has occurred on such day, such Valuation Date shall be the next succeeding end-of-month calendar day upon which no Market Disruption Event occurs. If a Valuation Date is postponed due to a Market Disruption Event or otherwise (such Valuation Date, a "Postponed Valuation Date"), the subsequent Valuation |

APPENDIX A-continued

PRINCIPAL PROTECTED [INDEX] LINKED NOTE
USD DENOMINATED PRINCIPAL PROTECTED NOTE
LINKED TO THE [INDEX]

| | |
|---|---|
| | Date shall be the last calendar day of the month after the month in which the Postponed Valuation Date occurs. Assuming no Market Disruption Events occur, the Valuation Date is scheduled to be Sep. 28, 2011 The Valuation Date for an Early Termination Event shall be the last business day of the month that ends after the [30th] calendar day after the Option Seller has sent its notice of early termination, provided that if such date is not an Index Business Date, the next following Index Business Date. |
| Expiration Time: | 10:00 a.m., New York time |
| Units: | Units (each, a "Unit") representing interests in the [Index] (the "Index"). |
| Hedge Shares: | Shares (each, a "Share") representing interests in the [Index Tracker] (the "Fund"). |
| Number of Units: | Initially [100,000] Upon the occurrence of a Downward Adjustment Event, the Number of Units shall be reduced on the relevant Adjustment Date, by an amount equal to the Adjustment Amount divided by the Index Level for the relevant Index Business Day for a hypothetical investor that initiated a redemption of its Hedge Shares on the Observation Date. If a Downward Adjustment Event results in more than one Adjustment Date, the Number of Units shall be reduced on such dates as determined by the Calculation Agent. Upon the occurrence of an Upward Adjustment Event, the Number of Units shall be increased on the relevant Adjustment Date, by an amount equal to the Adjustment Amount divided by the Index Level for the relevant Index Business Day for a hypothetical investor that initiated a subscription for the Hedge Shares on the Observation Date. |
| Option Premium: | [USD 20,000,000] in cash (20% of the initial Notional Amount) |
| Notional Amount: | The product of the Index Value times the Number of Units, as determined by the Calculation Agent. Initially, the Notional Amount will equal [USD 100,000,000] and will be adjusted as described in "Option Adjustment". |
| Strike Price: | Initially, [USD 80,000,000] (80% of the Notional Amount), accreting daily at the Floating Rate plus the Spread on the basis of Act/360, compounded monthly from the Effective Date to but not including the Payment Date, and adjusted as described in "Option Adjustment". |
| Floating Rate: | USD-LIBOR-BBA with a designated maturity of 1 month, determined two Business Days prior to the first of each month commencing with the Effective Date. |
| Spread: | [1.75] percent |
| Adjustment Ratio: | On any Observation Date, Adjustment Ratio = Notional Amount/(Notional Amount – Strike Price) For purposes of determining the Adjustment Ratio on any Observation Date, the Calculation Agent may use the lesser of the last estimated Index value as provided by the Administrator of the Hedge Shares or the last available Index value as published. Solely for purposes of determining the Adjustment Ratio between an Observation Date and the corresponding Adjustment Date, the Calculation Agent shall treat the Notional Amount and the Strike Price as if each had been adjusted by the Adjustment Amount on such Observation Date. |
| Initial Adjustment Ratio: | 5.0 as of the Effective Date |
| Target Adjustment Ratio: | 5.0 |
| Maximum Adjustment Ratio: | 6.0 |
| Minimum Adjustment Ratio: | 4.0 |
| Option Adjustment: | If on any Observation Date the Calculation Agent determines that the then-current Adjustment Ratio exceeds the Maximum Adjustment Ratio (a "Downward Adjustment Event"), the Strike Price and the Notional Amount shall be reduced by the same Adjustment Amount on the relevant Adjustment Date (a "Downward Adjustment"). The Calculation Agent shall determine the Adjustment Amount on the Observation Date pursuant to the following formula: Adjustment Amount = Notional Amount on the Observation Date – ((Notional Amount on the Observation Date – Strike Price on the Observation Date) × Target Adjustment Ratio) In the event that the Strike Price is reduced to or below the Minimum Strike Price, the Index Option will terminate early pursuant to the "Early Termination Events" section. If on any Observation Date the Calculation Agent determines that the then-current Adjustment Ratio is below the Minimum Adjustment Ratio (an "Upward Adjustment Event"), the Strike Price and the Notional Amount shall be increased by the same Adjustment Amount on the relevant Adjustment Date (an "Upward Adjustment"). The Calculation Agent shall determine the Adjustment Amount on the Observation Date pursuant to the following formula: Adjustment Amount = ((Notional Amount on the Observation Date – Strike Price on the Observation Date) × Target Adjustment Ratio) – Notional Amount on the Observation Date However, under no circumstances shall the Strike Price be increased above the Maximum Strike Price pursuant to an Upward Adjustment. If the Strike Price is adjusted such that it equals the Maximum Strike Price, the Adjustment Amount for purposes of calculating the Number of Units and Notional Amount shall be the amount by which the Strike Price is actually adjusted. |
| Minimum Strike Price: | USD 25,000,000 |
| Maximum Strike Price: | USD 160,000,000 |
| Adjustment Dates: | For Downward Adjustments: The day that a hypothetical investor in the Hedge Shares would receive proceeds with respect to redeeming Hedge Shares if it initiated such redemption on the applicable Observation Date, as determined by the Calculation Agent. If such proceeds would be received on more than one date, the Adjustment Dates will be each date that such proceeds would actually be received, with the Number of Units, Notional Amount and Strike Price adjusted on such dates as determined by the Calculation Agent. For Upward Adjustments: The day that a hypothetical investor in the Hedge Shares would deliver proceeds with respect to subscribing for Hedge Shares if it initiated such subscription on the applicable Observation Date, as determined by the Calculation Agent. |
| Observation Dates: | Dates on which the Index Level is published, commencing with May 2, 2005 and ending with Aug. 31, 2012 |
| Index Business Days: | Any day (a) as of which the Index Level is published and (b) on which a Market Disruption Event has not occurred. |
| Cash Settlement Amount: | The Note Issuer shall receive on the Payment Date the following amount in USD: Max [Notional Amount$_f$ – Strike Price$_f$, 0] Where "Notional Amount$_f$" means the Notional Amount as of the Valuation Date "Strike Price$_f$" means the Strike Price as of the Payment Date |

APPENDIX A-continued

PRINCIPAL PROTECTED [INDEX] LINKED NOTE
USD DENOMINATED PRINCIPAL PROTECTED NOTE
LINKED TO THE [INDEX]

| | |
|---|---|
| Payment Date: | The fifth Business Day after the day that a hypothetical investor in the Hedge Shares would receive proceeds with respect to redeeming Hedge Shares if the NAV Date for such redemption were the Valuation Date, as determined by the Calculation Agent. If such proceeds would be received on more than one date, the Payment Dates will be the fifth Business Day after each date that such proceeds would actually be received, with the Cash Settlement Amount proportionately paid on such dates as determined by the Calculation Agent. |
| Early Termination Events: | An "Early Termination Event" means the occurrence of any of the following events, as determined by the Calculation Agent in its sole discretion:<br>1. The Index Sponsor fails to comply with the index methodology or any of the funds underlying the Index fails to comply with the asset allocation policy, each as represented by the Index Sponsor to the Calculation Agent, unless such failure is waived by the Calculation Agent;<br>2. The Index Sponsor fails to provide the Calculation Agent with information the Calculation Agent deems necessary to determine compliance with the index methodology or asset allocation policy in a timely manner;<br>3. The Index Sponsor announces that it will make a material change in the formula for or method of calculating that Index or in any other way materially modifies the Index;<br>4. The Index Sponsor fails to calculate and publish the Index Level for more than 5 consecutive Business Days;<br>5. The Index is terminated;<br>6. The Index, the Index Sponsor, the Administrator (defined below) or the Investment Manager (defined below) materially breaches any applicable law or regulation or any regulatory or governmental authority brings an administrative or judicial proceeding or commences an inquiry against the Index Sponsor, the Administrator or the Investment Manager alleging any misconduct or wrongdoing;<br>7. The annualized volatility of the Index Level exceeds 15% for a six-month rolling window;<br>8. There is a change in tax law, tax regulations or the interpretation of tax law or tax regulations by any court, tribunal or regulatory authority which could have an adverse economic impact for the Note Issuer with respect to the Notes or its hedge (as defined below);<br>9. The occurrence of a Hedging Disruption Event that is not waived by the Note Issuer. A "Hedging Disruption Event" means that the Note Issuer, or any affiliate, is unable, after using commercially reasonable efforts, to hedge or would incur a materially increased amount of tax, duty, expense or fee, as compared to its costs and anticipated costs as of the Trade Date, to hedge. As used in this termsheet, "hedge" means: (A) acquire, establish, re-establish, substitute, maintain, unwind or dispose of any transaction(s) or asset(s) the Note Issuer deems necessary to hedge the risk of entering into and performing its obligations with respect to the Index Option or (B) to realize, recover or remit the proceeds of any such transaction(s) or asset(s).<br>10. The administrator or investment manager of a transaction or asset deemed necessary by the Note Issuer, or any affiliate, to hedge (the "Administrator" and the "Investment Manager", respectively) ceases to act in the capacity of administrator or investment manager and a replacement administrator or investment manager is not appointed immediately and/or is not acceptable to the Calculation Agent. |

APPENDIX A-continued

PRINCIPAL PROTECTED [INDEX] LINKED NOTE
USD DENOMINATED PRINCIPAL PROTECTED NOTE
LINKED TO THE [INDEX]

| | |
|---|---|
| | 11. The Index Level is no longer calculated in USD;<br>12. Index Option Seller is unable to purchase or sell the Hedge Shares on at least a monthly basis;<br>If an Early Termination Event occurs, the Option Seller will send notice of early termination to the Note Issuer, the Index Option shall be cancelled as of the Valuation Date and the Note Issuer shall be entitled to an amount equal to the Cash Settlement Amount, as determined by the Calculation Agent, less the cost to the Option Seller, or any affiliate, of unwinding any related hedging arrangements, as determined by the Option Seller. |
| Early Termination Amount: | An amount equal to the market value of the Option as of the last calendar day of the month immediately preceding the month in which the Early Termination Date occurs, as determined by the Calculation Agent, less the cost to the Option Seller, or any affiliate, of unwinding any related hedging arrangements, as determined by the Option Seller; provided that if the Calculation Agent determines that a Market Disruption Event has occurred on such day, the Calculation Agent shall determine the Early Termination Amount with reference to the next succeeding end-of-month calendar day upon which no Market Disruption Event occurs..<br>In determining the Early Termination Amount, the Calculation Agent may, but need not, consider any relevant information, including, without limitation, information consisting of relevant market data in the relevant market including, without limitation, relevant rates, prices, yields, volatilities, spreads, correlations or other relevant market data from internal sources (including any affiliates of the Calculation Agent) or otherwise.<br>The "Early Termination Amount" shall be determined by the Calculation Agent. |
| Early Termination Date: | The date provided in the Option Seller's notice of early termination to the Option Buyer. |
| Market Disruption Event: | Market Disruption Event means, on any day, any event that disrupts or impairs the ability of the Issuer, or any affiliate, to obtain values for such day for any transaction or asset deemed necessary by the Issuer, or any affiliate, to hedge, at which value the Issuer, or any affiliate, could subsequently unwind or dispose of such transaction or asset. |
| Business Days | New York, London |
| Calculation Agent: | [ ], whose determinations and calculations shall be binding absent manifest error. |

APPENDIX B

Zero Coupon Custodial Receipt:

| | |
|---|---|
| CUSIP: | [ ]. |
| Original Aggregate Principal Amount Outstanding: | $2,950,000. |
| Issue Date: | Apr. 27, 2005. |
| Maturity Date: | Jul. 1, 2012. |
| Initial Deposit Price: | 80%. |
| Original Issue Price: | 80%. |
| Adjusted Issue Price: | 80%. |
| Initial Market Value: | Initial Deposit Price multiplied by the Original Aggregate Principal Amount Outstanding. |
| Interest Rate per Annum: | No interest will be paid on the Zero Coupon Custodial Receipt. |
| Interest Payment Dates: | No interest will be paid on the Zero Coupon Custodial Receipt. |
| Redemptions: | See details of Custodial Receipt Underlying Bonds in Exhibit A attached hereto. |
| Specified Private Activity Bond (Subject to AMT): | No. |
| Pre-Refunded Bonds: | No. |

APPENDIX B-continued

Zero Coupon Custodial Receipt:

| | |
|---|---|
| Principal Credit Source: | The governmental issuer of the Custodial Receipt Underlying Bonds described in Exhibit A attached hereto or, if any other Principal Credit Source is identified in such Exhibit A hereto, such other Principal Credit Source. |
| Principal: | Principal will be paid on the Maturity Date. |

Final Interest Payment Custodial Receipt:

| | |
|---|---|
| CUSIP: | |
| Notional Principal Amount: | $50,000. |
| Issue Date: | Apr. 27, 2005. |
| Maturity Date: | Jul. 1, 2012. |
| Initial Deposit Price: | 80%. |
| Original Issue Price: | 80%. |
| Adjusted Issue Price: | 80%. |
| Initial Market Value: | Initial Deposit Price multiplied by the Original Aggregate Principal Amount Outstanding. |
| Yield per Annum: | 3.1331% (331.31 bps per annum) yield. |
| Interest Payment Date: | Jul. 1, 2012. |
| Redemptions: | See details of Custodial Receipt Underlying Bonds in Exhibit A attached hereto. |
| Specified Private Activity Bond (Subject to AMT): | No. |
| Pre-Refunded Bonds: | No. |
| Principal Credit Source: | The governmental issuer of the Custodial Receipt Underlying Bonds described in Exhibit A attached hereto or, if any other Principal Credit Source is identified in such Exhibit A hereto, such other Principal Credit Source. |
| Principal: | No principal will be paid on the Final Interest Payment Custodial Receipt. |
| Underlying Securities Transfer Restrictions: | No transfer of a Custodial Receipt (including transfers of beneficial ownership not registered on the books of the Custodian and over which the Custodian has no direct control) will be made unless the transferor obtains from the transferee holder or beneficial owner of such Custodial Receipt (and presents a copy of the same to the Depositor) a letter describing the nature of the transferee and its holding of such Custodial Receipt and also certifying to the effect that: (i) the transferee is either (a) an "Accredited Investor," as that term is defined in Rule 501(a) of Regulation D under the Securities Act, is purchasing for its own account and for investment purposes only and has such knowledge and experience in financial or business matters that it is capable of evaluating the merits and risk of an investment such as the Custodial Receipt or (b) a "Qualified Institutional Buyer," within the meaning of Rule 144A under the Securities Act ("Rule 144A"), in which case the Custodial Receipt is to be registered with The Depository Trust Company ("DTC"), New York, New York, or any other securities depository and the transferee has provided the required information relating to its status as a "Qualified Institutional Buyer" within the meaning of Rule 144A; (ii) the transferee has provided the required information relating to its status as a "Qualified Purchaser," as that term is defined in Section 2(a)(51) of the Investment Company Act, and the Depositor reasonably believes such information to be true, accurate and complete; (iii) the transferee was not formed solely to acquire the Custodial Receipt and is not an investment company (or other entity) relying on Section 3(c)(1) or Section 3(c)(7) of the Investment Company Act for an exemption from registration thereunder as an investment company; subject in each case to such additional conditions imposed on permitted investors as may be set forth in a supplement hereto; (iv) the transferee, and each subsequent transferee, may not sell or otherwise dispose of the Custodial Receipt except to a further transferee who provides or has provided a written certificate to similar effect; and (v) the transferee has received all information regarding the Custodial Receipt necessary to make an informed decision to invest in the Custodial Receipt, including information requested to verify other information received, and has received all information that it has requested from the the seller, and the transferee has been afforded a reasonable time to ask questions about the tents and conditions of the offering of the Custodial Receipt and has received complete and satisfactory answers to all such questions. The transferee, and each subsequent transferee, may not sell or otherwise dispose of the Custodial Receipt except to a further transferee who provides or has provided a written certificate to similar effect. |
| Form of Underlying Securities: | The Zero Coupon Custodial Receipt and the Final Interest Payment Custodial Receipt will initially be held at DTC in book-entry form and exchangeable, at the option of the registered owner thereof, to physical form. |
| Amendments Not Requiring Consent of Beneficial Owners of Custodial Receipts: | The form of the Custodial Receipts and any provisions of the Custody Agreement may be amended at any time by agreement between the Custodian and the Depositor without the consent of any of the beneficial owners of the Custodial Receipts for purposes of (i) providing for a qualified securities depository to replace DTC, (ii) modifying any provisions to the extent necessary to maintain the tax-exempt treatment or securities treatment of the Custodial Receipts, or (iii) curing any formal defect, omission, inconsistency or ambiguity deemed necessary or desirable by the Depositor; provided that, in the case of (iii) above, the Custodian shall have received an opinion of counsel satisfactory to the Custodian that such amendment will not adversely affect the interests of any beneficial owners of the Custodial Receipts. |
| Amendments Requiring Consent of Beneficial Owners of Custodial Receipts: | All other amendments to the form of the Custodial Receipts or to any provisions of the Custody Agreement may be made only with the consent of 100% of the beneficial owners of the affected Custodial Receipts, which consent will be executed by the DTC participant (as listed on either an official DTC position listing or an official DTC proxy that holds the Custodial Receipts on behalf of the registered owner). |

APPENDIX C

EXEMPLARY PERIODIC RESET CALL OPTION AGREEMENT

| | |
|---|---|
| Periodic Reset Call Option Agreement: | On the Closing Date, the Trust will enter into an option transaction (the "Periodic Reset Call Option") with the Call Option Seller. The Periodic Reset Call Option will be documented using ISDA documentation. |
| Effective Date: | Apr. 27, 2005. |
| Periodic Reset Call Option Style: | European (exercisable only on the Expiration Date). |
| Expiration Date: | Oct. 31, 2012, subject to adjustment in accordance with the Following Business Day Convention, an Early Termination Event or if the Valuation Date is postponed. |
| Expiration Time: | 10:00 a.m., New York time. |
| Call Option Seller: | [Call Option Seller] |
| Call Option Guarantor: | The obligations of the Call Option Seller under the Periodic Reset Call Option Agreement will be unconditionally and irrevocably guaranteed by [Call Option Guarantor] pursuant to a guarantee issued in favor of the Trust. |
| Notional Amount: | The product of (a) the Index Level and (b) the Number of Units, each as determined by the Calculation Agent plus (i) the Upward Adjustment Amount on each day between and including the Upward Adjustment Date and the Relevant Index Business Day or (ii) the Downward Adjustment Amount on each day between and including the Relevant Index Business Day and the Downward Adjustment Date, as applicable. On the Effective Date, the Notional Amount will equal $3,000,000 and is subject to adjustment as set forth in "-Adjustment" herein. "Relevant Index Business Day" means the Index Business Day on which a hypothetical investor who initiated a subscription or redemption of its Hedge Shares on the Observation Date would receive or lose its exposure to the Funds, as applicable. "Index Level" means the published level of the Index on an Index Business Day with the initial Index Level being the published level of the Index on Apr. 29, 2005 (or, if such day is not an Index Business Day, the next following Index Business Day) (the "Initial Index Level"). |
| Strike Price: | Initially $2,400,000 (originally 80% of the Notional Amount), accreting daily at the Call Option Strike Accretion Rate, compounded monthly from the Effective Date to, but not including, the Call Option Settlement Date, subject to adjustment as set forth in "-Adjustment" herein. |
| Amounts Payable by Call Option Seller: | Under the Periodic Reset Call Option Agreement, on each Call Option Settlement Date the Call Option Seller is obligated to pay to the Trust the related Call Option Settlement Amount, if any, for such date. |
| Call Option Premium: | Under the Periodic Reset Call Option Agreement, the Trust is obligated to pay to the Call Option Seller USD 600,000 (originally 20% of the Notional Amount) (the "Call Option Premium") on the Effective Date. |
| Valuation Date: | The Valuation Date for automatic exercise of the Periodic Reset Call Option on the Expiration Date shall be the last calendar day of the month prior to the Expiration Date (the "Valuation Date"); provided that if the Index Level is not published as of such date, the Calculation Agent shall refer to the Index Level for the immediately preceding Business Day as of which the Index Level is published in determining the Index Level for such Valuation Date. If the scheduled Valuation Date is not an Index Business Day due to a Market Disruption Event, the Valuation Date shall be postponed until the last Index Business Day of the succeeding month; provided that if there are no Index Business Days in the succeeding month, an Early Termination Event shall occur. Assuming no Market Disruption Event occurs, the Valuation Date is scheduled to be Sep. 28, 2012. |
| | "Index Business Day" means any day (a) as of which the Index Level is published and (b) on which a Market Disruption Event has not occurred. "Market Disruption Event" means on any day, any event that disrupts or impairs the ability of the Calculation Agent, or any affiliate, to obtain values for such day for any transaction or asset deemed necessary by the Call Option Seller, or any affiliate, to Hedge, at which value the Call Option Seller, or any affiliate, could subsequently unwind or dispose of such transaction or asset. |
| Calculation Agent: | [Calculation Agent] |
| Index: | The Dow Jones Hedge Fund Balanced Portfolio Index, each interest therein represented by units (each, a "Unit"). A description of the Index is attached as Annex A hereto. "Index Publisher" means Dow Jones Hedge Fund Indexes, Inc. "Index Platform Provider" means [Index Platform Provider]. "Funds" means each of the six investable portfolio funds underlying the Dow Jones Hedge Fund Balanced Portfolio Index. "Hedge Shares" mean shares (each, a "Share") representing interests in all of the Funds. "Number of Units" means, initially, 1000 divided by the Initial Index Level. Upon the occurrence of a Downward Adjustment Event, the Number of Units shall be reduced on the Relevant Index Business Day, by an amount equal to the Downward Adjustment Amount divided by the Index Level for the Relevant Index Business Day. If a Downward Adjustment Event results in more than one Relevant Index Business Day, the Number of Units shall be reduced on such dates as determined by the Calculation Agent. Upon the occurrence of an Upward Adjustment Event, the Number of Units shall be increased on the Relevant Index Business Day, by an amount equal to the Upward Adjustment Amount divided by the Index Level for the Relevant Index Business Day. |
| Call Option Strike Accretion Rate: | The Base Rate plus the Spread multiplied by the Day Count Fraction. |
| Base Rate: | USD - LIBOR - BBA |
| Designed Maturity: | One Month. |
| Spread: | 1.75%. |
| Day Count Fraction: | Actual/360. |
| Reset Dates: | Two Business Days prior to the first day of each month commencing on the Effective Date. |
| Business Day: | Any day, other than a Saturday or Sunday, that is neither a legal holiday nor a day on which banking institutions and trust companies in New York City or London are authorized or obligated by law or executive order to close. |
| Call Option Settlement Amount(s): | As of any Call Option Settlement Date, the greater of (a) the Notional Amount as of the Valuation Date minus the Strike Price as of the Call Option Settlement Date and (b) zero; provided that in the event there is more than one Call Option Settlement Date, the Call Option Settlement Amount, if any, will be proportionately paid on each such Call Option Settlement Date. |
| Call Option Settlement Date(s): | Each fifth Business Day after the day that a hypothetical investor in the Hedge Shares would receive proceeds with respect to redeeming Hedge Shares if the Index Business Day for such redemption were the Valuation Date, as determined by the Calculation Agent. If such proceeds would be received on more than one date, the Call Option Settlement Dates will be the fifth Business Day after each date that such proceeds would actually be received. |

APPENDIX C-continued

EXEMPLARY PERIODIC RESET CALL OPTION AGREEMENT

| | |
|---|---|
| Adjustment: | If on any Observation Date:<br>(a) the Calculation Agent determines that the then-current Adjustment Ratio exceeds the Maximum Adjustment Ratio (such occurrence, a "Downward Adjustment Event"), the Strike Price and the Notional Amount will be reduced by the Downward Adjustment Amount on the related Downward Adjustment Date (a "Downward Adjustment"); or<br>(b) the Calculation Agent determines that the then-current Adjustment Ratio is below the Minimum Adjustment Ratio (such occurrence, an "Upward Adjustment Event"), the Strike Price and the Notional Amount will be increased by the Upward Adjustment Amount on the related Upward Adjustment Date (an "Upward Adjustment").<br>As used herein.<br>"Adjustment Amount" means any Upward Adjustment Amount or Downward Adjustment Amount, as applicable.<br>"Adjustment Ratio" means the Notional Amount divided by the difference between the Notional Amount and the Strike Price. As of the Effective Date, the Adjustment Ratio will equal 5.00. To determine the Adjustment Ratio, the Calculation Agent will use the Index Level as of the Observation Date. In the event that the Adjustment Ratio must be calculated during the period between an Observation Date and the corresponding Adjustment Date, the Calculation Agent will treat each of the Notional Amount and the Strike Price as though the Adjustment Amount had been applied as of such Observation Date.<br>"Downward Adjustment Amount" means, with respect to any Downward Adjustment, the (i) Notional Amount as of the Observation Date related to such Downward Adjustment minus (ii)(a) the difference between the Notional Amount and the Strike Price, each as of the Observation Date related to such Downward Adjustment, multiplied by (b) the Target Adjustment Ratio; provided that if the Downward Adjustment Amount decreases the Strike Price to an amount below the Minimum Strike Price, such event will constitute an Early Termination Event.<br>"Downward Adjustment Date" means, with respect to a redemption of the Hedge Shares on the related Observation Date, the day on which a hypothetical investor in such Hedge Shares would receive proceeds with respect to such redemption, as determined by the Calculation Agent. In the event such proceeds would be received on more than one date, the Downward Adjustment Date will be each date such proceeds would actually be received.<br>"Maximum Adjustment Ratio" means 6.00.<br>"Maximum Strike Price" means $4,800,000.<br>"Minimum Adjustment Ratio" means 4.00.<br>"Minimum Strike Price" means $750,000.<br>"Observation Date" means a day on which the Index Level is published commencing with May 2, 2005 and ending with Aug. 31, 2012.<br>"Target Adjustment Ratio" means 5.00.<br>"Upward Adjustment Amount" means, with respect to any Upward Adjustment, the difference between (i) the product of (a) the difference between the Notional Amount and the Strike Price, each as of the Observation Date related to such Upward Adjustment and (b) the Target Adjustment Ratio and (ii) the Notional Amount as of the Observation Date related to such Upward Adjustment; provided that if the Upward Adjustment Amount increases the Strike Price to an amount greater than the Maximum Strike Price, the Adjustment Amount will equal the difference of the Maximum Strike Price and the Strike Price before such adjustment.<br>"Upward Adjustment Date" means, with respect to a subscription for Hedge Shares on the related Observation Date, the day that a hypothetical investor in the Hedge Shares would deliver proceeds with respect to such subscription, as determined by the Calculation Agent. |
| Events of Default and Termination Events: | The Event of Default specified in clause (c) under the heading "The Periodic Reset Call Option Agreement - Events of Default" and only the Termination Event specified in clause (c) under the heading "The Periodic Reset Call Option Agreement - Termination Events" applies with respect to the Periodic Reset Call Option Agreement. See "The Periodic Reset Call Option Agreement" in the Private Placement Memorandum. |
| Additional Termination Events: | The following constitute Additional Termination Events under the Periodic Reset Call Option Agreement:<br>(i) The Index Publisher or the Index Platform Provider fails to provide the Calculation Agent with the information the Calculation Agent deems necessary to determine compliance with the index methodology or asset allocation policy in a timely manner;<br>(ii) The Index Publisher or the Index Platform Provider (a) fails to comply with the Index methodology as stipulated on the Effective Date or (b) announces that it will make, or does make, a material change in the formula for or the method of calculating the Index or in any other way materially modifies the Index or the Hedge Shares or permanently cancels the Index;<br>(iii) The Index Publisher or the Index Platform Provider fails to calculate and publish the Index Level for more than 5 consecutive Business Days;<br>(iv) The Index is terminated;<br>(v) The Index, the Index Publisher, the Index Platform Provider, the Administrator or the Investment Manager (as defined herein) materially breaches any applicable law or regulation or any regulatory or governmental authority brings an administrative or judicial proceeding or commences an inquiry against the Index Publisher, the Administrator or the Investment Manager alleging any misconduct or wrongdoing;<br>(vi) The annualized Volatility of the Index Level exceeds 15% for a six-month rolling window. "Volatility" for a given time window, means, as of any date of determination and with respect to the Index, the annualized standard deviation of the monthly percentage changes in the level of the Index for the particular time window preceding such date of determination, expressed as a percentage, as determined by the Calculation Agent;<br>(vii) There is a change in tax law, tax regulations, practice or the interpretation of tax law or tax regulations or practice by any court, tribunal or regulatory authority which could have an adverse economic impact for the Trust with respect to the Notes or the Call Option Seller's Hedge (as defined below);<br>(viii) The occurrence of a Hedging Disruption Event that is not waived by the Call Option Seller. A "Hedging Disruption Event" means that the Call Option Seller, or any affiliate, is unable, after using commercially reasonable efforts, to Hedge or would incur a materially increased amount of tax, duty, expense or fee, as compared to its costs and anticipated costs as of the Effective Date, to hedge. As used herein, "Hedge" means: (A) acquire, establish, re-establish, substitute, maintain, unwind or dispose of any transaction(s) or asset(s) the Call Option Seller deems necessary to hedge the risk of entering into and performing its obligations with respect to the Periodic Reset Call Option or (B) to realize, recover or remit the proceeds of any such transaction(s) or asset(s). |

APPENDIX C-continued

EXEMPLARY PERIODIC RESET CALL OPTION AGREEMENT

|  |  |
|---|---|
|  | (ix) The Administrator or the Investment Manager ceases to act in the capacity of administrator or investment manager and a replacement administrator or investment manager is not appointed immediately and/or is not acceptable to the Calculation Agent.<br>(x) The Index Level is no longer calculated in US Dollars;<br>(xi) The occurrence of an Early Redemption Event under the Trust Agreement that results in the early redemption of the Certificates;<br>(xii) The Downward Adjustment Amount decreases the Strike Price to an amount below the Minimum Strike Price;<br>(xiii) A termination of the License Agreement or the Sublicense Agreement;<br>(xiv) A Market Disruption Event occurs on the scheduled Valuation Date and there are no Index Business Days in the succeeding month;<br>(xv) There is a change in or adoption of any law due to the promulgation of, or any change in interpretation by any court, tribunal or regulatory authority of any law which causes it to become unlawful for the Call Option Seller, the Call Option Guarantor or any of their affiliates to perform any obligations hereunder or otherwise has material adverse consequences for the Call Option Seller, the Call Option Guarantor or any of their affiliates; or<br>(xvi) The Index Publisher is no longer Dow Jones Hedge Fund Indexes, Inc. or the Index Platform Provider is no longer Lyra Capital LLC.<br>As used herein:<br>"Administrator" means an administrator of a transaction or asset deemed necessary by the Issuer, or any affiliate, to Hedge.<br>"Investment Manager" means an investment manager of a transaction or asset deemed necessary by the Issuer, or any affiliate, to Hedge. |
| Early Termination Amount: | An amount equal to the market value of the Periodic Reset Call Option as of the last Business Day of the month immediately preceding the month in which the Early Termination Date occurs, as determined by the Calculation Agent, less the cost and total losses to the Call Option Seller, or any affiliate, of unwinding any related Hedge positions, as determined by the Call Option Seller; provided that if the Calculation Agent determines that a Market Disruption Event has occurred on such day, the Calculation Agent shall determine the Early Termination Amount with reference to the next succeeding end-of-month Business Day upon which no Market Disruption Event occurs; provided, further, that if a Market Disruption Event occurs on each of the six succeeding end-of-month Business Days, then the Calculation Agent shall make a good faith estimate of the market value of the Periodic Reset Call Option as of such sixth end-of-month Business Day.<br>In determining the Early Termination Amount, the Calculation Agent may, but is not required to, consider the following: (i) relevant market data in the relevant market including, without limitation, relevant rates, prices, yields, volatilities, spread or correlations, (ii) relevant market data from internal sources, including any affiliates of the Calculation Agent, and (iii) any other information deemed relevant by the Calculation Agent.<br>"Early Termination Date" means the date provided in the Call Option Seller's notice of early termination to the Trust.<br>The Early Termination Amount, if any, will be paid by the Call Option Seller to the Trust. |

We claim:

1. A computer-implemented method comprising:

Accessing by a computer, data regarding a variable option on at least one of:

a hedge fund, a fund of funds, and a hedge fund index, wherein said variable option is associated with a note and with at least one zero coupon municipal bond such that:

said note is configured to have a specified price, said at least one zero coupon municipal bond is configured to have a bond price less than said specified price and to provide a return substantially equal to said specified price, and said variable option is configured to have:

an option premium substantially equal to the difference between said specified price and said bond price, a variable notional amount that is initially substantially equal to said specified price, and a variable strike price that is initially substantially equal to said bond price; and periodically updating said data, by a computer, by re-computing said variable notional amount of said variable option and said variable strike price of said variable option.

2. The computer-implemented method as in claim 1, wherein said at least one zero coupon municipal bond matures on a specified maturity date, and wherein said option is exercisable on a date within 12 months of said specified maturity date.

3. The computer-implemented method as in claim 1, wherein said variable option is a periodic reset call option.

4. The computer-implemented method as in claim 1, wherein said variable option is an European option.

5. The computer-implemented method as in claim 1, further comprising: computing, by a computer, an adjustment ratio for said variable option based on said variable notional amount and said variable strike price; and adjusting, by a computer, said variable notional amount and said variable strike price when said adjustment ratio is greater than a predefined maximum adjustment ratio or less than a predefined minimum adjustment ratio.

6. A non-transitory computer readable storage medium having computer executable instructions recorded thereon that, when executed on a computer, configured the computer to perform a method comprising:

executing software for processing a variable option, wherein said software, when executed, causes said computer to perform steps comprising: accessing data regarding a variable option on at least one of:

a hedge fund, a fund of funds, and a hedge fund index, wherein said variable option is associated with a note and with at least one zero coupon municipal bond such that:

said note is configured to have a specified price;

said at least one zero coupon municipal bond is configured to have a bond price less than said specified price and to provide a return substantially equal to said specified price, and said variable option is configured to have:

an option premium substantially equal to the difference between said specified price and said bond price, a variable notional amount that is initially substantially equal to said specified price, and a variable strike price that is initially substantially equal to said bond price; and periodically updating said data by re-computing said variable notional amount of said variable option and said variable strike price of said variable option.

7. The non-transitory computer readable storage medium as in claim 6 wherein said at least one zero coupon municipal bond matures on a specified maturity date, and wherein said option is exercisable on a date within 12 months of said specified maturity date.

8. The non-transitory computer readable storage medium as in claim 6, wherein said variable option is a periodic reset call option.

9. The non-transitory computer readable storage medium as in claim 6, wherein said variable option is an European option.

10. The non-transitory computer readable storage medium as in claim 6, wherein said non-transitory computer readable storage medium causes said computer to perform further steps comprising:
- computing an adjustment ratio for said variable option based on said variable notional amount and said variable strike price; and
- adjusting said variable notional amount and said variable strike price when said adjustment ratio is greater than a predefined maximum adjustment ratio or less than a predefined minimum adjustment ratio.

* * * * *